(12) United States Patent
Kim

(10) Patent No.: US 11,339,663 B2
(45) Date of Patent: May 24, 2022

(54) ROTOR HAVING IMPROVED STRUCTURE, AND TURBINE AND GAS TURBINE INCLUDING THE SAME

(71) Applicant: DOOSAN HEAVY INDUSTRIES & CONSTRUCTION CO., LTD., Changwon (KR)

(72) Inventor: Ki Baek Kim, Changwon (KR)

(*) Notice: Subject to any disclaimer, the term of this patent is extended or adjusted under 35 U.S.C. 154(b) by 0 days.

(21) Appl. No.: 17/221,888

(22) Filed: Apr. 5, 2021

(65) Prior Publication Data

US 2021/0222561 A1    Jul. 22, 2021

Related U.S. Application Data

(62) Division of application No. 16/040,535, filed on Jul. 19, 2018, now abandoned.

(30) Foreign Application Priority Data

Sep. 29, 2017  (KR) .......................... 10-2017-0127456

(51) Int. Cl.
   *F01D 5/08*   (2006.01)
   *F02C 7/18*   (2006.01)
   *F02C 6/08*   (2006.01)

(52) U.S. Cl.
   CPC .............. *F01D 5/081* (2013.01); *F02C 6/08* (2013.01); *F02C 7/18* (2013.01); *F05D 2220/32* (2013.01); *F05D 2240/12* (2013.01); *F05D 2240/14* (2013.01); *F05D 2240/24* (2013.01); *F05D 2240/81* (2013.01); *F05D 2260/20* (2013.01)

(58) Field of Classification Search
   CPC ............... F01D 5/081; F02C 6/08; F02C 7/18
   See application file for complete search history.

(56) References Cited

U.S. PATENT DOCUMENTS

| 7,762,773 | B2* | 7/2010 | Liang | ..................... F01D 11/006 416/190 |
| 2016/0201469 | A1* | 7/2016 | Lewis | ..................... F01D 9/041 415/115 |

* cited by examiner

*Primary Examiner* — Sabbir Hasan
(74) *Attorney, Agent, or Firm* — Harvest IP Law, LLP

(57) ABSTRACT

A rotor of a turbine cooled by compressed air supplied from a compressor of a gas turbine prevents combustion gas from flowing between platforms and guides compressed air discharged outside the platform toward the blade airfoil. The rotor includes a disk having an outer circumferential surface; a plurality of blade airfoils arranged around the disk; and a plurality of platforms coupled to the outer circumferential surface of the disk, each platform having an outer circumferential surface to receive a corresponding blade airfoil and side-facing surfaces which are spaced apart from each other on adjacent platforms of the plurality of platforms to form a cooling passage through which the compressed air flows outward in a radial direction of the rotor, the cooling passage including a bend in a rotational direction of the rotor. The bend directs the compressed air in a direction opposite to the rotational direction of the rotor.

14 Claims, 7 Drawing Sheets

[FIG. 1]
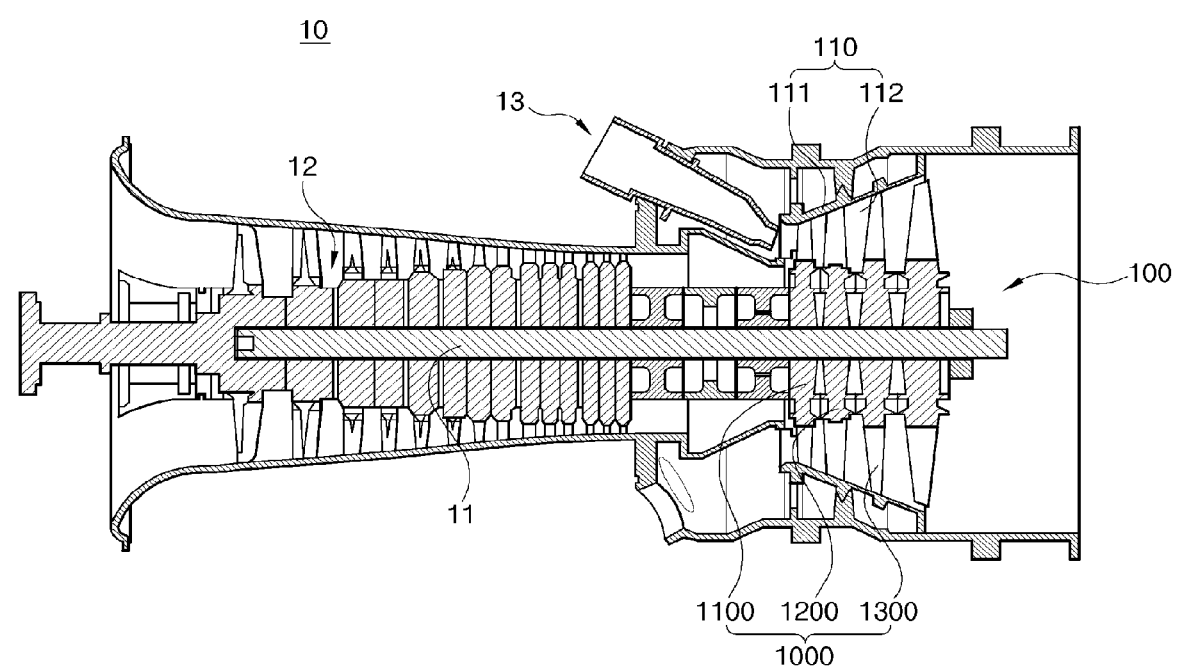

[FIG. 2]
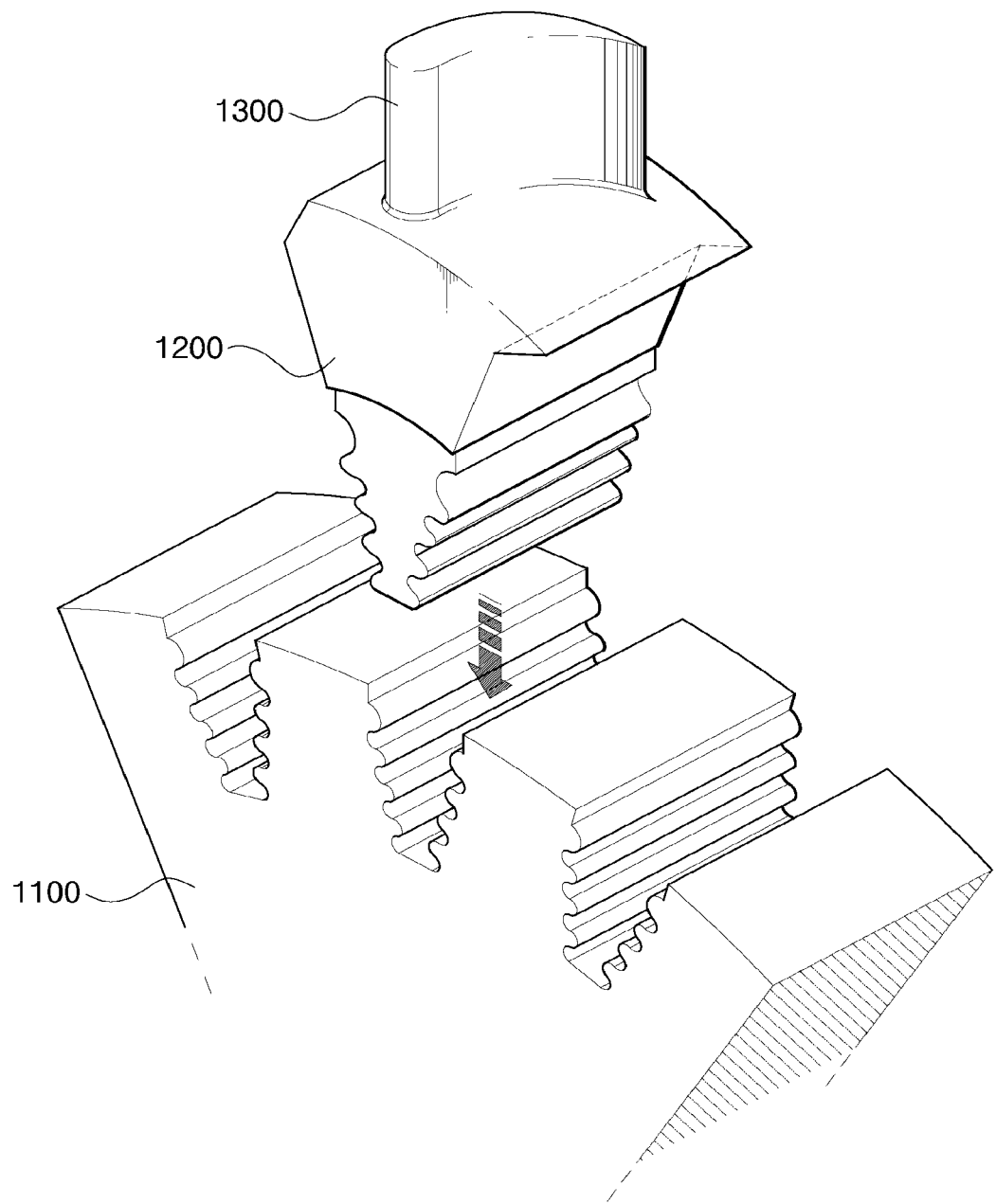

[FIG. 3]
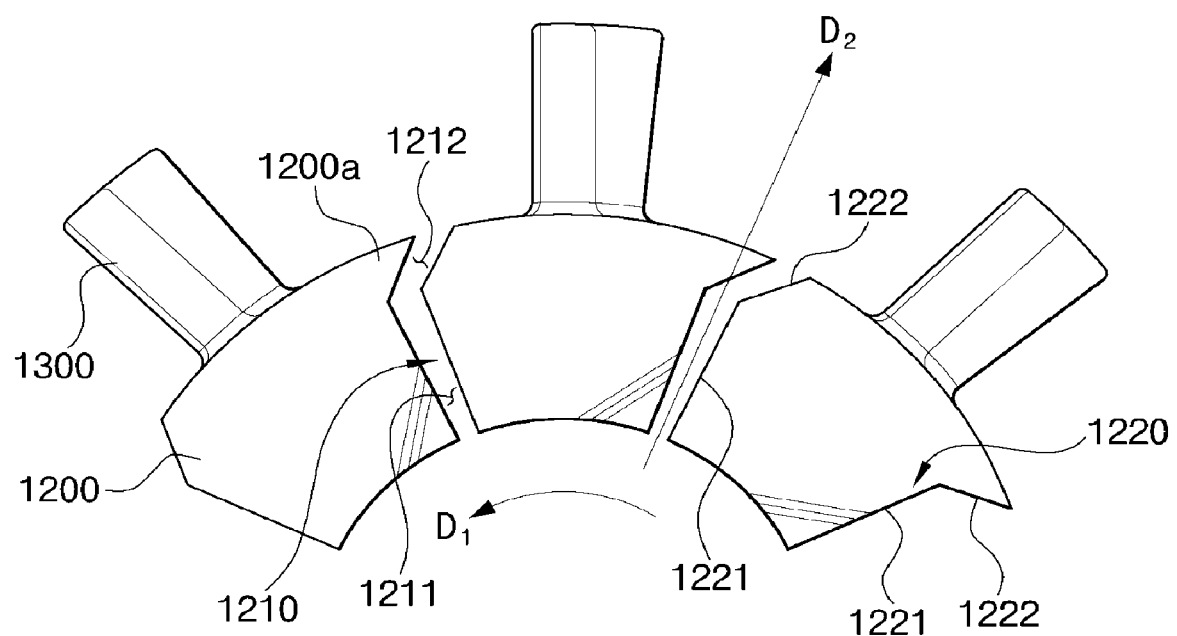

[FIG. 4]
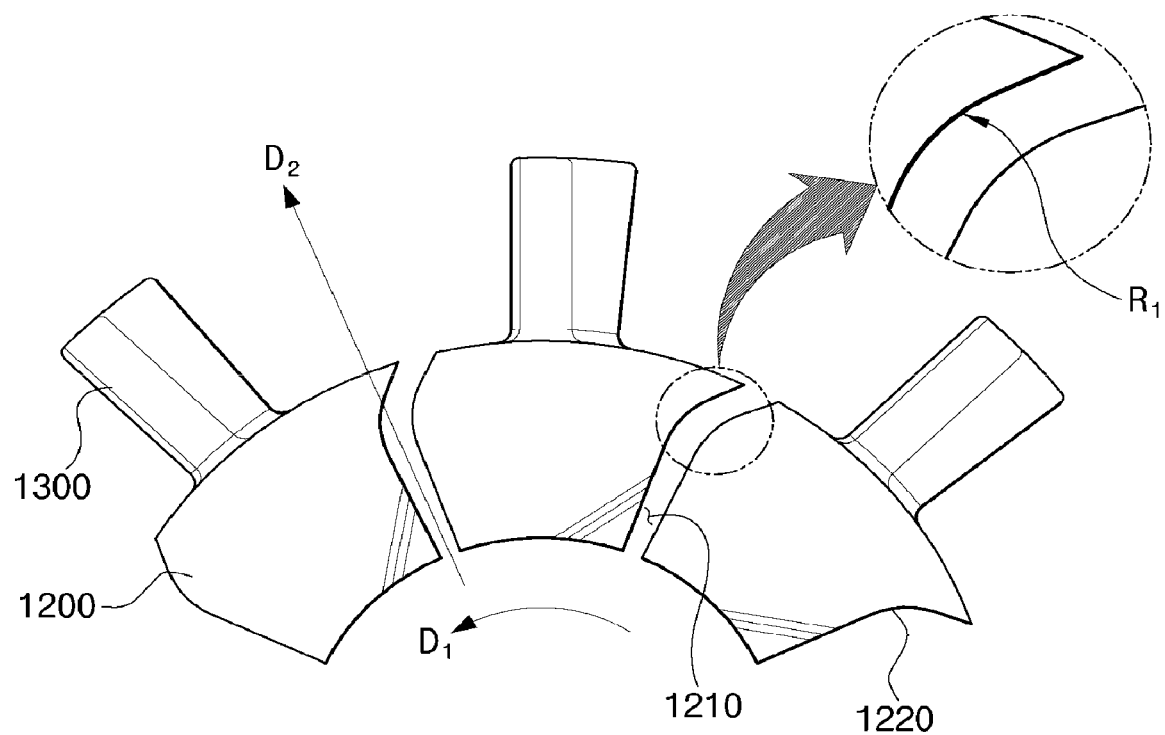

[FIG. 5]
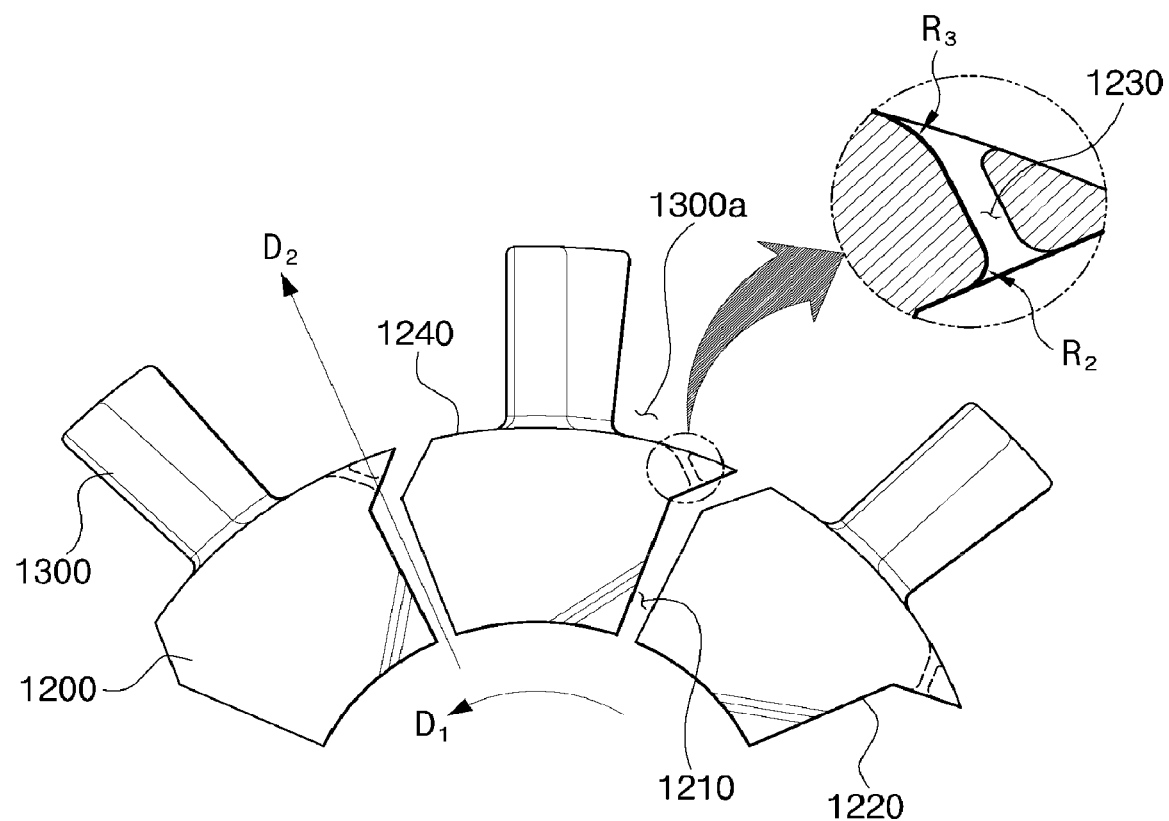

[FIG. 6]
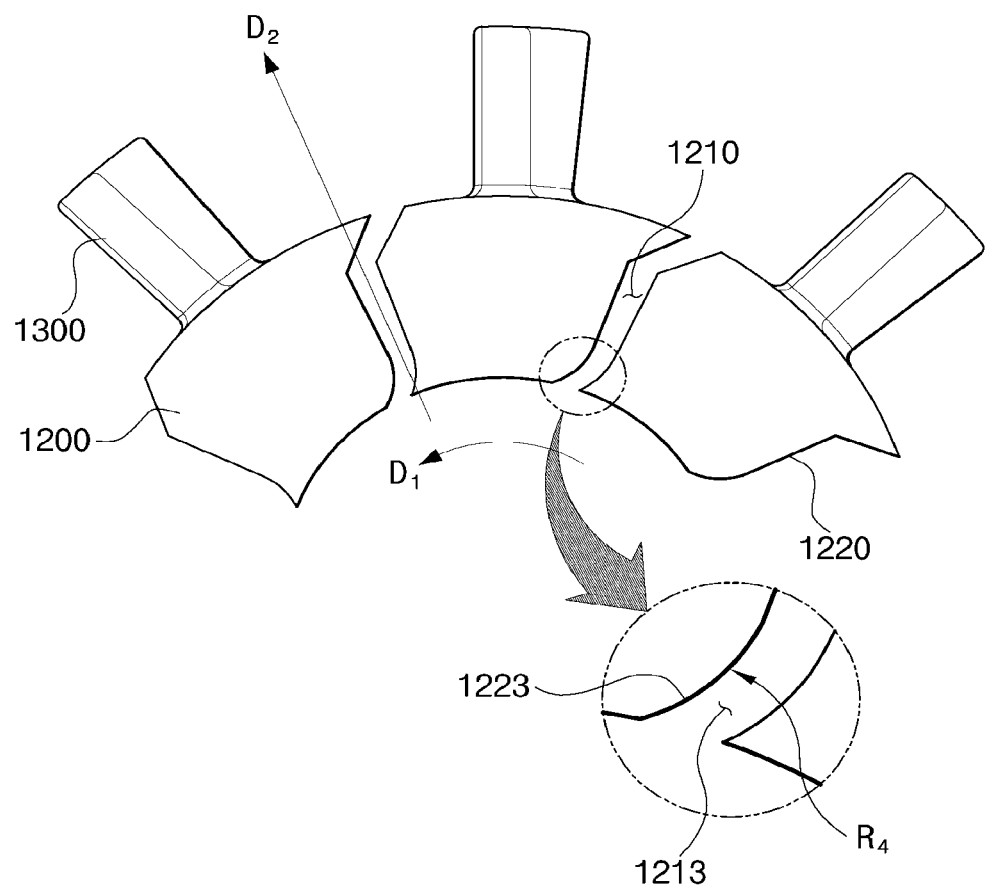

[FIG. 7]
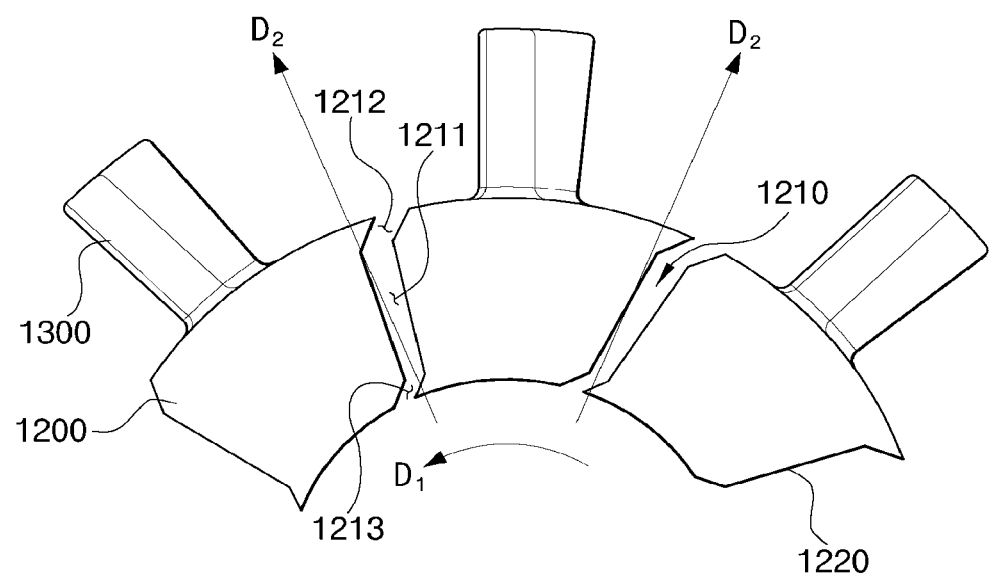

ROTOR HAVING IMPROVED STRUCTURE, AND TURBINE AND GAS TURBINE INCLUDING THE SAME

CROSS-REFERENCE TO RELATED APPLICATION

This is a divisional of U.S. application Ser. No. 16/040,535 filed Jul. 19, 2018, which claims priority to Korean Patent Application No. 10-2017-0127456, filed on Sep. 29, 2017, in the Korean Intellectual Property Office, the disclosure of which is incorporated herein in its entirety by reference.

BACKGROUND

Field

Exemplary embodiments of the present disclosure relate to a rotor, a turbine and a gas turbine comprising the same, and more particularly, to a rotor that rotates by combustion gas supplied from a combustor of a gas turbine, a turbine that generates power for electric power generation by rotation of the rotor, and the gas turbine comprising the same.

Description of the Related Art

The gas turbine is mainly composed of a compressor, a combustor, and a turbine. The compressor is provided with a compressor inlet scroll strut for introducing air, and a plurality of compressor vanes and compressor blades are alternately arranged in a compressor casing. The combustor supplies fuel to compressed air that is compressed in the compressor and ignites the air with a burner, which results in generation of combustion gas of high temperature and high pressure.

The turbine has a plurality of turbine vanes and turbine blades, which are alternately arranged in a turbine casing. In addition, a tie rod is disposed so as to pass through the centers of the compressor, the combustor and the turbine, and an exhaust chamber. Both ends of the tie rod are rotatably supported by bearings. A plurality of disks is fixed to the tie rod such that each of blades is connected to the disk, and the end of the tie rod closer to the exhaust chamber is connected to a drive shaft of a generator or the like.

The gas turbine has no reciprocating mechanism such as a piston of a four-stroke engine. Therefore, mutual friction parts like piston-cylinder do not exist, which leads to some advantages such as extremely low consumption of lubricating oil, drastic reduction in amplitude (which is characteristic of the reciprocating machine), and high speed motion.

Operations of the gas turbine will be briefly described. Air that has been compressed in the compressor is mixed with fuel and burned to produce a high temperature combustion gas. The produced combustion gas is injected toward the turbine. The injected combustion gas passes through the turbine vane and the turbine blade to generate a rotational force which, in turn, causes the rotor to rotate.

The rotor of the turbine included in the gas turbine includes a disk, a platform coupled to the outer side of the disk, and a blade airfoil that is coupled to the outer side of the platform and rotates by combustion gas flowing.

Here, the gas turbine has a problem that the combustion gas passing through the blade airfoil flows between the platforms. Furthermore, the gas turbine has a limitation that some of the compressed air discharged outwardly between the platforms do not flow toward the blade airfoil. Therefore, the gas turbine has a problem that the compressed air discharged from the platform is mixed with the combustion gas without effectively cooling the platform and the surface of the blade airfoil.

SUMMARY

An object of the present disclosure is to provide a rotor having an improved structure so as to prevent combustion gas from flowing between platforms and to guide compressed air discharged outside the platform toward the blade airfoil. It is another object of the present disclosure to provide a turbine and a gas turbine comprising the rotor having the improved structure.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, there is provided a rotor of a turbine cooled by compressed air supplied from a compressor of a gas turbine. The rotor may include a disk having an outer circumferential surface; a plurality of blade airfoils arranged around the disk; and a plurality of platforms coupled to the outer circumferential surface of the disk, each platform having an outer circumferential surface to receive a corresponding blade airfoil and side-facing surfaces which are spaced apart from each other on adjacent platforms of the plurality of platforms to form a cooling passage through which the compressed air flows outward in a radial direction of the rotor, the cooling passage including a bend in a rotational direction of the rotor.

In accordance with another aspect of the present disclosure, there is provided a turbine cooled by compressed air supplied from a compressor of a gas turbine. The turbine may include a stator that includes a casing and a vane coupled to an inner circumferential surface of the casing; and a rotor that includes a disk having an outer circumferential surface; a plurality of blade airfoils arranged around the disk and disposed between the vanes; and the above plurality of platforms.

In accordance with another aspect of the present disclosure, a gas turbine may include a compressor that sucks and compresses air; a combustor that produces a combustion gas by burning fuel and the compressed air; and a turbine that generates power by passing the combustion gas. The turbine is consistent with the above.

The bend of the cooling passage may be formed such that the compressed air flows in a direction opposite to the rotational direction of the rotor.

The side-facing surfaces of the platform may each include a radial surface extending radially from an outer circumferential surface of the disk and a discharge surface extends from a radially outer end of the radial surface toward a direction opposite to the rotational direction, and the cooling passage may include a radial passage formed between adjacent radial surfaces and a discharge passage formed between adjacent discharge surfaces.

The radial surface and the discharge surface may be connected to each other by a curved surface having a predetermined curvature.

The rotor may further include a branch passage formed through the platform and branched from the cooling passage in order to supply the compressed air to the blade airfoil. The branch passage may enable the discharge passage to communicate with a rear side region of the blade airfoil. The branch passage may have an inner surface connected to one of the side-facing surfaces of the platform by a curved surface having a predetermined curvature.

The side-facing surfaces of the platform may further include suction surfaces bending in the rotational direction and extending from the radial surface in the radial direction, and the cooling passage may include a suction passage formed between adjacent suction surfaces. The radial surface and the suction surface may be connected by a curved surf ace having a predetermined curvature.

The radial passage may be formed to be inclined toward a direction opposite to the rotational direction with respect to the radial direction as the radial passage runs from the suction passage to the discharge passage.

As described above, the rotor, the turbine, and the gas turbine comprising the same according to the present disclosure can prevent combustion gas from flowing between platforms and guide compressed art discharged to the outside of the platform to the blade airfoil, which makes it possible to effectively cool the platform and the surface of the blade airfoil.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a sectional diagram showing a schematic structure of a gas turbine to which an embodiment of the present disclosure is applied;

FIG. 2 is a perspective view of a platform and a blade airfoil of the turbine shown in FIG. 1;

FIG. 3 is a front axial view of a portion of a rotor including the platform and the blade airfoil of FIG. 2, according to an embodiment of the present disclosure;

FIG. 4 is a front axial view of a portion of a rotor including the platform and the blade airfoil of FIG. 2, according to another embodiment of the present disclosure in which a radial surface and a discharge surface of the platform are shown connected by a curved surface;

FIG. 5 is a front axial view of a portion of a rotor including the platform and the blade airfoil of FIG. 2, according to another embodiment of the present disclosure in which a branch passage is shown;

FIG. 6 is a front axial view of a portion of a rotor including the platform and the blade airfoil of FIG. 2, according to another embodiment of the present disclosure in which a discharge passage is shown; and FIG. 7 is a front axial view of a portion of a rotor including the platform and the blade airfoil of FIG. 2, according to another embodiment of the present disclosure in which the radial passage is shown an inclined state.

DETAILED DESCRIPTION

While the present disclosure will be described with reference to embodiments shown in the drawings, these are merely illustrative, and it is to be understood by those skilled in the art that various modifications and equivalent embodiments can be made. Therefore, the true scope of protection of the present disclosure should be determined by the technical spirit of the appended claims.

Hereinafter, embodiments of a rotor, a turbine, and a gas turbine comprising the same according to the present disclosure will be described in detail with reference to the drawings.

Referring to FIGS. 1 and 2, the gas turbine 10 according to an embodiment of the present disclosure includes a tie rod 11, a compressor 12, a combustor 13, and a turbine 100.

The tie rod 11 is a rod-like member and is disposed to pass through the centers of the compressor 12 and the turbine 100 such that a rotor of the compressor 12 and the rotor 1000 of the turbine 100 are fastened to each other. The compressor 12 is installed on one end of the tie rod 11 to suck and compress air by rotation. In addition, the compressor 12 supplies compressed air to the combustor 13 and the turbine 100. The combustor 13 burns the compressed air supplied from the compressor 12 together with fuel supplied from an external fuel tank (not shown) to produce combustion gas.

The turbine 100 receives the generated combustion gas from the combustor 13 to generate power for electric power generation. In addition, the turbine 100 cools various electrical components constituting the turbine 100 through the compressed air supplied from the compressor 12. The cooling is to prevent thermal damage or melting of the electric components in the turbine 100, which may be caused by the heat of the combustion gas.

The turbine 100 includes a stator 110 and a rotor 1000. The stator 110 includes a casing 111 provided at the other end of the tie rod 11 and a plurality of vanes 112 coupled to an inner circumferential surface of the casing 111 so as to face the tie rod 11. The rotor 1000 is installed in the casing 111 and rotates by flowing combustion gas. The rotor 1000 includes a plurality of disks 1100 and, for each disk, a plurality of platforms 1200 and a plurality of blade airfoils 1300. Each disk 1100 is provided on the outer circumferential surface of the tie rod 11.

As shown in FIG. 3, the plurality of platforms 1200 are coupled to the outer circumferential surface of each disk 1100 and extend in a radial direction D2 of the tie rod 11. In addition, the plurality of platforms 1200 are arranged to be spaced apart from each other to form a cooling passage 1210 between platforms 1200 adjacent to each other. The compressed air, supplied from the compressor 12 to the disk 1100, exits the disk in the radial direction D2 by flowing along the cooling passage 1210.

The blade airfoils 1300 are respectively coupled to an outer circumferential surface of the platforms 1200 and extend in the radial direction D2. In addition, as the combustion gas supplied from the combustor 13 passes through the blade airfoils 1300, which rotate about the tie rod 11 as a rotation center. Accordingly, the platforms 1200 and the disks 1100 being coupled to the blade airfoils 1300 are also rotated together about the tie rod 11.

Referring to FIGS. 2 and 3, the cooling passage 1210 may have a shape in which a radially outer portion of the cooling passage 1210 includes a bend in a circumferential direction, namely, in the direction opposite to a direction D1 of the rotation of the rotor 1000, such that the compressed air flowing in the cooling passage 1210 can be discharged in the direction opposite to the rotational direction D1. To create the shape of the passage 1210, the platforms 1200 are formed to have a corresponding bend.

Specifically, a circumferentially facing side surface of the platform 1200 forming the cooling passage 1210, that is, a side-facing surface 1220 between adjacent platforms 1200 may include a radial surface 1221 and a discharge surface 1222. The radial surface 1221 is formed to extend outward away from the outer circumferential surface of the disk 1100 in the radial direction D2. The discharge surface 1222 is formed to create a bend in the side-facing surface 1220. That is, the discharge surface 1222 extends from the radially outer end of the radial surface 1221 toward the direction opposite to the rotational direction D1. Here, it should appreciated that the cooling passage 1210 is formed by an opposing pair of side-facing surfaces 1220 that mirror each other.

The cooling passage 1210 is composed of a radial passage 1211 formed between opposing radial surfaces 1221 and a discharge passage 1212 formed between opposing discharge surfaces 1222. The discharge passage 1212 of the cooling passage 1210 extends in an alternate direction from the radial passage 1211, namely, in the direction opposite to the rotational direction D1, to form a bend in the cooling passage 1210.

If the cooling passage 1210 were a linear passage extending straight outward in the radial direction D2, rather than the bent cooling passage of the present disclosure, the compressed air discharged outside along the cooling passage would not be guided toward a neighboring blade airfoil 1300 but would be dispersed directly into the combustion gas flowing outside the platform 1200. In the case of the above linear passage, unlike the bent passage, the temperature of the flowing combustion gas is undesirably lowered and the flow of the combustion gas is disturbed, which may lead to a lowered overall efficiency of the gas turbine 10. Furthermore, in this case, the surfaces of the platform 1200 and the blade airfoil 1300 are insufficiently cooled, which may lead to thermal damage of the platform 1200 and the blade airfoil 1300. In addition, in the case of a linear cooling passage 1210 that extends straight outward in the radial direction D2, unlike the bent cooling passage, the flowing combustion gas may enter the cooling passage through its discharge port, that is, through the outlet of the discharge passage 1212.

However, when the cooling passage 1210 is formed to have a bend as described above, the compressed air discharged through the discharge passage 1212 is guided toward the blade airfoil 1300 through the surface of the platform 1200. Therefore, in the rotor 1000 according to the embodiment of the present disclosure, and in the turbine 100 and the gas turbine 10 comprising the same, the compressed air is allowed to flow along the surfaces of the platform 1200 and the blade airfoil 1300, which enables the sufficient cooling of the surfaces of the platform 1200 and the blade airfoil 1300 by the compressed air and further enables a prevention of the flowing combustion gas from being disturbed by the compressed gas discharged through the cooling passage 1210. Accordingly, the thermal kinetic energy of the combustion gas can be efficiently converted into the rotational kinetic energy of the rotor 1000.

Furthermore, when the cooling passage 1210 is formed to have a bend as described above, a protruding portion 1200a of the platform 1200 that protrudes to form the discharge passage 1212 serves as an entry barrier against the combustion gas flowing outside the platform 1200. Therefore, in the rotor 1000 according to the embodiment of the present disclosure, and in the turbine 100 and the gas turbine 10 comprising the same, it is possible to reliably prevent the combustion gas can be from flowing into the cooling passage 1210.

Meanwhile, referring to FIG. 4, the radial surface 1221 and the discharge surface 1222 may be connected to each other by a curved surface having a predetermined curvature R1. In this case, the compressed air discharged from the radial passage 1211 to the discharge passage 1212 may be smoothly guided along the curved surface toward the discharge passage 1212, which makes it possible to reduce vibration and impact applied to the platform 1200 and the blade airfoil 1300 by the compressed air flowing along the cooling passage 1210.

Referring to FIG. 5, the platform 1200 may be provided with a branch passage 1230 passing through the protruding portion 1200a. The branch passage 1230 is branched from the cooling passage 1210 in order to supply the compressed air to the blade airfoil 1300. More specifically, the branch passage 1230 may be formed so as to enable the discharge passage 1212 to communicate with a rear side region 1300a on the rear side of the blade airfoil 1300. Here, the rear side of the blade airfoil 1300 is referenced with respect to the rotational direction D1.

The compressed air discharged outside the platform 1200 through the discharge passage 1212 flows along the surface of the platform 1200 to a front side of the blade airfoil 1300 with respect to the rotational direction D1. As shown in FIG. 5, when the branch passage 1230 is formed to enable the discharge passage 1212 to communicate with the rear-side region 1300a of the blade airfoil 1300, some of the compressed air discharged from the radial passage 1211 and entering the discharge passage 1212 is supplied to the rear-side region 1300a of the blade airfoil 1300 along the branch passage 1230. Accordingly, the entire blade airfoil 1300 including the front, lateral, and rear sides can be cooled by the compressed air discharged from the cooling passage 1210.

Here, an inner surface of the branch passage 1230 and the discharge surface 1222 may be connected to each other by a curved surface having a predetermined curvature R2. In this case, the compressed air branched from the discharge passage 1212 smoothly flows into the branch passage 1230 along the curved surface.

Furthermore, the inner surface of the branch passage 1230 and a seating surface 1240 of the platform 1200 on which the blade airfoil 1300 is seated may be connected to each other by a curved surface having a predetermined curvature R3. In this case, the compressed air discharged from the branch passage 1230 to the seating surface 1240 may be smoothly guided to the seating surface 1240 of the platform 1200 along the curved surface, which makes it possible to prevent impact applied to the blade airfoil 1300 by the compressed air discharged from the branch passage 1300.

Referring to FIG. 6, the suction end of the cooling passage 1210 may be formed to include a curve extending in the rotational direction D1. More specifically, the side-facing surface 1220 of the platform 1200 may include a suction surface 1223 extending from the radial surface 1221 and bending in the rotational direction D1 with respect to the radial surface 1221. In this case, the cooling passage 1210 is formed between adjacent suction surfaces 1223 to include a suction passage 1213 bent (curved) toward the rotational direction D1 with respect to the radial passage 1211.

If the suction passage 1213 were not exist and the radial passage 1211 extending in the radial direction D2 were to form the suction end of the cooling passage, the compressed air flowing into the radial passage 1211 would, by rotation of the rotor 1000, collide with the far side of the radial surface 1221 of the radial passage 1211, causing a disruption in the flow. Here, the far side of the radial surface 1221 of the radial passage 1211 may be referred to as the rear radial surface 1211 with respect to the rotational direction D1.

However, when the suction passage 1213 described above is formed between adjacent platforms 1200, the compressed air flowing into the cooling passage 1210 through the suction passage 1213 does not collide with the far side of the side-facing surface 1220 of the platform 1200. Here, the surface's far side corresponds to the rear side of a platform 1200 with respect to the rotational direction D1. Rather, the compressed air flowing into the cooling passage 1210 through the suction passage 1213 is smoothly guided to the radial passage 1211 along the suction surface 1223.

Here, in order to smoothly guide the compressed air to the radial passage 1211 along the suction surface 1223, the radial surface 1221 and the suction surface 1223 may be connected to each other by a curved surface having a predetermined curvature R4.

Referring to FIG. 7, when the radial direction D2 is taken as a reference, the radial passage 1211 may be formed to be inclined to the opposite direction of the rotational direction D1, as the radial passage 1211 extends from the suction passage 1213 to the discharge passage 1212.

In this case, as the platform 1200 rotates, the concentration of stress applied to the rear radial surface 1221 of the platform 1200 with respect to the rotational direction D1 by the compressed air can be reduced, which, in turn, makes it possible to reduce vibration and impact applied to the platform 1200.

Although exemplary embodiments of the present invention have been described hereinabove, those skilled in the art will appreciate that various modifications, additions, and substitutions are possible without departing from the scope of the invention as defined in the accompanying claims.

What is claimed is:

1. A rotor of a turbine cooled by compressed air supplied from a compressor of a gas turbine, the rotor comprising:
    a disk having an outer circumferential surface;
    a plurality of blade airfoils arranged around the disk;
    a plurality of platforms coupled to the outer circumferential surface of the disk, each of the plurality of platforms having an outer circumferential surface to receive a corresponding blade airfoil of the plurality of blade airfoils and side-facing surfaces which are spaced apart from each other on adjacent platforms of the plurality of platforms to form a cooling passage through which the compressed air flows outward in a radial direction of the rotor, the cooling passage including a bend in a rotational direction of the rotor; and
    a branch passage formed through each of the plurality of platforms and branched from the cooling passage to supply the compressed air to the each of the plurality of blade airfoils,
    wherein each of the side-facing surfaces of each of the plurality of platforms includes a radial surface extending radially from the outer circumferential surface of the disk and a discharge surface extending in a direction opposite to the rotational direction from a radially outer end of the radial surface, and
    the cooling passage includes a radial passage formed between adjacent radial surfaces and a discharge passage formed between adjacent discharge surfaces,
    wherein a protruding portion of each of the plurality of platforms protruding to form the discharge passage prevents combustion gas from flowing into the cooling passage,
    wherein the branch passage is formed through the protruding portion to communicate with a rear side region of each of the plurality of blade airfoils and the discharge passage.

2. The rotor of claim 1, wherein the bend of the cooling passage is formed such that the compressed air flows in the direction opposite to the rotational direction of the rotor.

3. The rotor of claim 1, wherein the discharge passage extends in the direction opposite to the rotational direction to form the bend in the cooling passage.

4. The rotor of claim 1, wherein the compressed air discharged through the discharge passage is guided toward each of the plurality of blade airfoils through the discharge surface of the plurality of platforms by the cooling passage having the bend.

5. The rotor of claim 1, wherein some of the compressed air discharged from the radial passage and entering the discharge passage is supplied to the rear side region of each of the plurality of blade airfoils along the branch passage so that an entire blade airfoil of each of the plurality of blade airfoils including front, lateral, and rear sides is cooled.

6. The rotor of claim 1, wherein the branch passage has an inner surface connected to one of the side-facing surfaces of each of the plurality of platforms by a curved surface having a predetermined curvature.

7. The rotor of claim 6, wherein the branch passage has the inner surface connected to a seating surface of each of the plurality of platforms on which the corresponding blade airfoil is seated by a curved surface having a predetermined curvature.

8. A turbine cooled by compressed air supplied from a compressor of a gas turbine, the turbine comprising:
    a stator that includes a casing and vanes coupled to an inner circumferential surface of the casing; and
    a rotor that includes
    a disk having an outer circumferential surface;
    a plurality of blade airfoils arranged around the disk and disposed between the vanes;
    a plurality of platforms coupled to the outer circumferential surface of the disk, each platform of the plurality of platforms having an outer circumferential surface to receive a corresponding blade airfoil of the plurality of blade airfoils and side-facing surfaces which are spaced apart from each other on adjacent platforms of the plurality of platforms to form a cooling passage through which the compressed air flows outward in a radial direction of the rotor, the cooling passage including a bend in a rotational direction of the rotor; and
    a branch passage formed through each of the plurality of platforms and branched from the cooling passage to supply the compressed air to each of the plurality of blade airfoils,
    wherein each of the side-facing surfaces of each of the plurality of platforms includes a radial surface extending radially from the outer circumferential surface of the disk and a discharge surface extending in a direction opposite to the rotational direction from a radially outer end of the radial surface, and
    the cooling passage includes a radial passage formed between adjacent radial surfaces and a discharge passage formed between adjacent discharge surfaces,
    wherein a protruding portion of each of the plurality of platforms protruding to form the discharge passage prevents combustion gas from flowing into the cooling passage,
    wherein the branch passage is formed through the protruding portion to communicate with a rear side region of each of the plurality of blade airfoils and the discharge passage.

9. The turbine of claim 8, wherein the bend of the cooling passage is formed such that the compressed air flows in the direction opposite to the rotational direction of the rotor.

10. The rotor of claim 8, wherein the discharge passage extends in the direction opposite to the rotational direction to form the bend in the cooling passage.

11. The rotor of claim 8, wherein the compressed air discharged through the discharge passage is guided toward each of the plurality of blade airfoils through the discharge surface of the plurality of platforms by the cooling passage having the bend.

12. The rotor of claim 8, wherein some of the compressed air discharged from the radial passage and entering the discharge passage is supplied to the rear side region of each of the plurality of blade airfoils along the branch passage so that an entire blade airfoil of each of the plurality of blade airfoils including front, lateral, and rear sides is cooled.

13. A gas turbine comprising:
- a compressor that sucks and compresses air;
- a combustor that produces a combustion gas by burning fuel and the compressed air; and
- a turbine that generates power by passing the combustion gas and includes
  - a stator that includes a casing and vanes coupled to an inner circumferential surface of the casing; and
  - a rotor that includes a disk having an outer circumferential surface; a plurality of blade airfoils arranged around the disk and disposed between the vanes; a plurality of platforms coupled to the outer circumferential surface of the disk, each platform of the plurality of platforms having an outer circumferential surface to receive a corresponding blade airfoil of the plurality of blade airfoils and side-facing surfaces which are spaced apart from each other on adjacent platforms of the plurality of platforms to form a cooling passage through which the compressed air flows outward in a radial direction of the rotor, the cooling passage including a bend in a rotational direction of the rotor; and a branch passage formed through each of the plurality of platforms and branched from the cooling passage to supply the compressed air to each of the plurality of blade airfoils,
- wherein each of the side-facing surfaces of each of the plurality of platforms includes a radial surface extending radially from the outer circumferential surface of the disk and a discharge surface extending in a direction opposite to the rotational direction from a radially outer end of the radial surface, and
- the cooling passage includes a radial passage formed between adjacent radial surfaces and a discharge passage formed between adjacent discharge surfaces,
- wherein a protruding portion of each of the plurality of platforms protruding to form the discharge passage prevents the combustion gas from flowing into the cooling passage,
- wherein the branch passage is formed through the protruding portion to communicate with a rear side region of each of the plurality of blade airfoils and the discharge passage.

14. The gas turbine of claim 13, wherein the bend of the cooling passage is formed such that the compressed air flows in the direction opposite to the rotational direction of the rotor.

\* \* \* \* \*